United States Patent [19]

Kupperblatt et al.

[11] Patent Number: 5,744,551
[45] Date of Patent: Apr. 28, 1998

[54] HIGH STRENGTH POLYETHYLENE FILM

[75] Inventors: Sandra Ann Kupperblatt, Flanders, N.J.; Michael William Tilston, St. Albans, W. Va.; George Edward Ealer, Whitehouse Station, N.J.

[73] Assignee: Union Carbide Chemicals & Plastics Technology Corporation, Danbury, Conn.

[21] Appl. No.: 828,408

[22] Filed: Mar. 28, 1997

[51] Int. Cl.$^6$ .......................... C08L 23/08; C08F 255/02
[52] U.S. Cl. .......................... 525/240; 525/53; 525/324
[58] Field of Search ........................ 525/240, 324, 525/53

[56] References Cited

U.S. PATENT DOCUMENTS

| | | | |
|---|---|---|---|
| 5,250,612 | 10/1993 | Hazlitt et al. | 525/53 |
| 5,371,145 | 12/1994 | Daniell et al. | 525/240 |
| 5,382,630 | 1/1995 | Stehling et al. | 525/240 |
| 5,387,749 | 2/1995 | Govoni et al. | 525/53 |
| 5,405,901 | 4/1995 | Daniell et al. | 525/53 |
| 5,422,400 | 6/1995 | Kamiyama et al. | 525/240 |
| 5,464,905 | 11/1995 | Tsutsui et al. | 525/240 |
| 5,514,455 | 5/1996 | Michie et al. | 428/220 |

FOREIGN PATENT DOCUMENTS 0717055  6/1996  European Pat. Off. .

*Primary Examiner*—Irina S. Zemel
*Attorney, Agent, or Firm*—Saul R. Bresch

[57] ABSTRACT

A blend comprising a mixture of two ethylene/alpha-olefin copolymers, said blend having a flow index in the range of about 5 to about 50 grams per 10 minutes; a melt flow ratio in the range of about 10 to about 50; a density in the range of 0.900 to 0.940 gram per cubic centimeter; a molecular weight in the range of about 98,000 to about 190,000; and an Mw/Mn ratio in the range of about 2 to about 8, said blend having been prepared by mixing first and second copolymers having about equal molecular weights, each copolymer being a copolymer of ethylene and an alpha-olefin having 3 to 8 carbon atoms, the first copolymer having a flow index in the range of about 5 to about 75 grams per 10 minutes; a melt flow ratio in the range of about 10 to about 50; a density in the range of 0.860 to 0.930 gram per cubic centimeter; a molecular weight in the range of about 87,000 to about 190,000; and an Mw/Mn ratio in the range of about 2 to about 4 and the second copolymer having a flow index in the range of about 5 to about 75 grams per 10 minutes; a melt flow ration in the range of about 10 to about 50; a density in the range of 0.935 to 0.970 gram per cubic centimeter; a molecular weight in the range of about 87,000 to about 190,000; and an Mw/Mn ratio in the range of about 2 to about 4, the weight ratio of the first copolymer to the second copolymer being in the range of about 70:30 to about 30:70.

9 Claims, No Drawings

HIGH STRENGTH POLYETHYLENE FILM

TECHNICAL FIELD

This invention relates to film extruded from a blend of polyethylene copolymers.

BACKGROUND INFORMATION

There has been a rapid growth in the market for linear low density polyethylene (LLDPE), particularly resin made under mild operating conditions, typically at pressures of 100 to 300 pounds per square inch (psi) and reaction temperatures of less than 100 degrees C. This low pressure process provides a broad range of LLDPE products for blown and cast film, injection molding, rotational molding, blow molding, pipe, tubing, and wire and cable applications. LLDPE has essentially a linear backbone with only short chain branches, about 2 to 6 carbon atoms in length. In LLDPE, the length and frequency of branching, and, consequently, the density, is controlled by the type and amount of comonomer used in the polymerization.

LLDPE resins designed for commodity type applications typically incorporate 1-butene as the comonomer. The use of a higher molecular weight alpha-olefin comonomer produces resins with significant strength advantages relative to those of ethylene/1-butene copolymers. The predominant higher alpha-olefin comonomers in commercial use are 1-hexene, 4-methyl-1-pentene, and 1-octene. The bulk of the LLDPE is used in film products where the excellent physical properties and drawdown characteristics of LLDPE film makes this film well suited for a broad spectrum of applications. Fabrication of LLDPE film is generally effected by the blown film and slot casting processes. The resulting film is characterized by excellent tensile strength, high ultimate elongation, good impact strength, and excellent puncture resistance.

These properties together with toughness are enhanced when the polyethylene is of high molecular weight. However, as the molecular weight of the polyethylene increases, the processability of the resin usually decreases. By providing a blend of polymers, the properties characteristic of high molecular weight resins can be retained and processability, particularly the extrudability (from the lower molecular weight component) can be improved.

Blends of polymers can be made using several methods such as by dry mixing or melt mixing polymers. Another way of preparing a blend of different polymers is by using a staged reactor process such as those described in U.S. Pat. Nos. 5,047,468 and 5,126,398. Briefly, the process is one for the in situ blending of polymers wherein one ethylene copolymer is prepared in a high melt index reactor and another ethylene copolymer is prepared in a low melt index reactor. The process typically comprises continuously contacting, under polymerization conditions, a mixture of ethylene and one or more alpha-olefins with a magnesium/titanium catalyst system in two reactors connected in series.

While the in situ blends prepared as above and the films produced therefrom are found to have the advantageous characteristics heretofore mentioned, industry continues to seek films with characteristics tailored to particular applications. One such application is consumer and institutional garbage bags, which require a film having high Elmendorf Tear Strength. Such a film is the subject matter of U.S. Pat. No. 5,514,455. The drive for thinner bags suggests that this same market would be better served by even higher Elmendorf Tear Strengths, particularly in the machine direction (MD).

DISCLOSURE OF THE INVENTION

An object of this invention, therefore, is to provide a blend, which can be extruded into a film having higher Elmendorf Tear Strengths in the machine direction than previously obtained. Other objects and advantages will become apparent hereinafter.

According to the present invention such a blend has been discovered. The blend of this invention comprises a mixture of two ethylene/alpha-olefin copolymers, said blend having a flow index in the range of about 5 to about 50 grams per 10 minutes; a melt flow ratio in the range of about 10 to about 50; a density in the range of 0.900 to 0.940 gram per cubic centimeter; a molecular weight in the range of about 98,000 to about 190,000; and an Mw/Mn ratio in the range of about 2 to about 8, said blend having been prepared by mixing first and second copolymers having about equal molecular weights, each copolymer being a copolymer of ethylene and an alpha-olefin having 3 to 8 carbon atoms, the first copolymer having a flow index in the range of about 5 to about 75 grams per 10 minutes; a melt flow ratio in the range of about 10 to about 50; a density in the range of 0.860 to 0.930 gram per cubic centimeter; a molecular weight in the range of about 87,000 to about 190,000; and an Mw/Mn ratio in the range of about 2 to about 4 and the second copolymer having a flow index in the range of about 5 to about 75 grams per 10 minutes; a melt flow ratio in the range of about 10 to about 50; a density in the range of 0.935 to 0.970 gram per cubic centimeter; a molecular weight in the range of about 87,000 to about 190,000; and an Mw/Mn ratio in the range of about 2 to about 4, the weight ratio of the first copolymer to the second copolymer being in the range of about 70:30 to about 30:70.

It will be readily apparent when comparing this blend with, for example, the blend of U.S. Pat. No. 5,514,455 that the blend of the present invention contains two high molecular weight copolymers as opposed to the high and low molecular weight copolymers of the prior art; that the densities of each copolymer in the blend are distinctly different; and that the melt flow ratio of the blend is lower.

DESCRIPTION OF THE PREFERRED EMBODIMENT(S)

Elmendorf Tear Strength is a measure of the film's resistance to tearing propagation of a precut slit, and, if sufficiently high, assures that the film will be capable of being utilized, for example, in the downgauged consumer and institutional trash bags as mentioned above. Elmendorf Tear Strength is determined under ASTM D-1992-89. It is measured in grams per mil both in the machine direction (MD) and in the transverse direction (TD). In this invention, the Elmendorf Tear Strength in the machine direction is, generally, at least about 450 grams per mil, and is often in the range of about 600 to about 1000 grams per mil. The Elmendorf Tear Strength in the transverse direction can be at least about 650 grams per mil, and is preferably in the range of about 700 to about 1200 grams per mil. The MD is important when sealing in the machine direction, the most common direction for sealing. Thus, an increase in MD and the balance between MD and TD become important. The closer together the MD and TD are the better.

The film is formed by extrusion. The extruder is a conventional one using a die, which will provide the desired gauge. The gauge of the films of interest here can be in the range of about 0.3 to about 2.5 mils, and is preferably in the range of about 0.75 to about 2.0 mils. Examples of various extruders, which can be used in forming the film, are the single screw type modified with a blown film die and air ring and continuous take off equipment. A typical single screw type extruder can be described as one having a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and multiple heating zones from the rear heating zone to the front heating zone, the multiple sections and zones running from upstream to downstream. If it has more than one barrel, the barrels are connected in series. The length to diameter ratio of each barrel is in the range of about 16:1 to about 30:1. The extrusion can take place at temperatures in the range of about 160 to about 270 degrees C., and is preferably carried out at temperatures in the range of about 180 to about 240 degrees C.

The blend is produced by mixing two polymers of about equal molecular weights. The flow index of the first copolymer can be in the range of about 5 to about 75 grams per 10 minutes, and is preferably in the range of about 5 to about 25 grams per 10 minutes. The flow index of the second copolymer can be in the range of about 5 to about 75 grams per 10 minutes, and is preferably in the range of about 5 to about 25 grams per 10 minutes.

The copolymers are copolymers of ethylene and one alpha-olefin comonomer having 3 to 8 carbon atoms, and can be, for example, propylene, 1-butene, 1-hexene, 4-methyl-1-pentene, and 1-octene. The preferred comonomers are 1-butene and 1-hexene.

The linear polyethylene blend components can be produced using various transition metal catalyst. The polyethylene blend of subject invention is preferably produced in the gas phase by various low pressure processes. The blend can also be produced in the liquid phase in solutions or slurries by conventional techniques, again at low pressures. Low pressure processes are typically run at pressures below 1000 psi whereas high pressure processes are typically run at pressures above 15,000 psi. Typical transition metal catalyst systems, which can be used to prepare the blend, are magnesium/titanium based catalyst systems, which can be exemplified by the catalyst system described in U.S. Pat. No. 4,302,565; vanadium based catalyst systems such as those described in U.S. Pat. Nos. 4,508,842; 5,332,793; 5,342,907; and 5,410,003; a chromium based catalyst system such as that described in U.S. Pat. No. 4,101,445; and a metallocene catalyst system such as those described in U.S. Pat. Nos. 4,937,299; 5,317,036; and 5,527,752. Many of these catalyst systems are often referred to as Ziegler-Natta catalyst systems. Catalyst systems, which use chromium or molybdenum oxides on silica-alumina supports, are also useful. Preferred catalyst systems for preparing the components for the blends of this invention are magnesium/titanium catalyst systems and metallocene catalyst systems.

The magnesium/titanium based catalyst system will be used to exemplify the process, e.g., the catalyst system described in U.S. Pat. No. 4,302,565 although the precursor is preferably unsupported and another catalyst system in which the precursor is formed by spray drying and is used in slurry form. Such a catalyst precursor, for example, contains titanium, magnesium, an electron donor, and, optionally, an aluminum halide. The precursor is then introduced into a hydrocarbon medium such as mineral oil to provide the slurry form. The catalyst system is described in U.S. Pat. No. 5,290,745.

The electron donor, if used in the catalyst precursor, is an organic Lewis base, liquid at temperatures in the range of about 0 degrees C. to about 200 degrees C., in which the magnesium and titanium compounds are soluble. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethyl formate, methyl acetate, ethyl anisate, ethylene carbonate, tetrahydropyran, and ethyl propionate.

While an excess of electron donor is used initially to provide the reaction product of titanium compound and electron donor, the reaction product finally contains about 1 to about 20 moles of electron donor per mole of titanium compound and preferably about 1 to about 10 moles of electron donor per mole of titanium compound.

An activator compound, which is generally used with any of the titanium based catalyst precursors, can have the formula $AlR_aX_bH_c$ wherein each X is independently chlorine, bromine, iodine, or OR'; each R and R' is independently a saturated aliphatic hydrocarbon radical having 1 to 14 carbon atoms; b is 0 to 1.5; c is 0 or 1; and a+b+c=3. Preferred activators include alkylaluminum mono- and dichlorides wherein each alkyl radical has 1 to 6 carbon atoms and the trialkylaluminums. Examples are diethylaluminum chloride and tri-n-hexylaluminum. About 0.10 to about 10 moles, and preferably about 0.15 to about 2.5 moles, of activator are used per mole of electron donor. The molar ratio of activator to titanium is in the range of about 1:1 to about 10:1, and is preferably in the range of about 2:1 to about 5:1.

The hydrocarbyl aluminum cocatalyst can be represented by the formula $R_3Al$ or $R_2AlX$ wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexylaluminum, di-isobutyl-aluminum hydride, dihexylaluminum hydride, di-isobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, and ethylaluminum sesquichloride. The cocatalyst compounds can also serve as activators and modifiers.

As noted above, it is preferred not to use a support. However, in those cases where it is desired to support the precursor, silica is the preferred support. Other suitable supports are inorganic oxides such as aluminum phosphate, alumina, silica/alumina mixtures, silica modified with an organoaluminum compound such as triethylaluminum, and silica modified with diethyl zinc. A typical support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 1.0 millimole of titanium per gram of support and preferably about 0.4 to about 0.9 millimole of titanium per gram of support. Impregnation of the above mentioned catalyst precursor into a silica support can be accomplished by mixing the precursor and silica gel in the electron donor solvent or other solvent followed by solvent removal under reduced pressure. When a support is not desired, the catalyst precursor can be used in liquid form.

Activators can be added to the precursor either before and/or during polymerization. In one procedure, the precursor is fully activated before polymerization. In another procedure, the precursor is partially activated before polymerization, and activation is completed in the reactor. Where a modifier is used instead of an activator, the modifiers are usually dissolved in an organic solvent such as isopentane and, where a support is used, impregnated into the support following impregnation of the titanium compound or complex, after which the supported catalyst precursor is dried. Otherwise, the modifier solution is added by itself directly to the reactor. Modifiers are similar in chemical structure and function to the activators as are cocatalysts. For variations, see, for example, U.S. Pat. No. 5,106,926. The cocatalyst is preferably added separately neat or as a solution in an inert solvent, such as isopentane, to the polymerization reactor at the same time as the flow of ethylene is initiated.

U.S. Pat. No. 5,106,926 provides another example of a magnesium/titanium based catalyst system comprising:

(a) a catalyst precursor having the formula $Mg_dTi(OR)_eX_f(ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is 1.5d+2;

(b) at least one modifier having the formula $BX_3$ or $AlR_{(3-e)}X_e$ wherein each R is alkyl or aryl and is the same or different, and X and e are as defined above for component (a)

wherein components (a) and (b) are impregnated into an inorganic support; and (c) a hydrocarbyl aluminum cocatalyst.

The precursor is prepared from a titanium compound, a magnesium compound, and an electron donor. Titanium compounds, which are useful in preparing these precursors, have the formula $Ti(OR)_eX_h$ wherein R, X, and e are as defined above for component (a); h is an integer from 1 to 4; and e+h is 3 or 4. Examples of titanium compounds are $TiCl_3$, $TiCl_4$, $Ti(OC_2H_5)_2Br_2$, $Ti(OC_6H_5)Cl_3$, $Ti(OCOCH_3)Cl_3$, and $Ti(OCOC_6H_5)Cl_3$. The magnesium compounds include magnesium halides such as $MgCl_2$, $MgBr_2$, and $MgI_2$. Anhydrous $MgCl_2$ is a preferred compound. About 0.5 to 56, and preferably about 1 to 10, moles of the magnesium compounds are used per mole of titanium compound.

The electron donor, the support, and the cocatalyst are the same as those described above. As noted, the modifier can be similar in chemical structure to the aluminum containing activators. The modifier has the formula $BX_3$ or $AlR_{(3-e)}X_e$ wherein each R is independently alkyl having 1 to 14 carbon atoms; each X is independently chlorine, bromine, or iodine; and e is 1 or 2. One or more modifiers can be used. Preferred modifiers include alkylaluminum mono- and dichlorides wherein each alkyl radical has 1 to 6 carbon atoms; boron trichloride; and the trialkylaluminums. About 0.1 to about 10 moles, and preferably about 0.2 to about 2.5 moles, of modifier can be used per mole of electron donor. The molar ratio of modifier to titanium can be in the range of about 1:1 to about 10:1 and is preferably in the range of about 2:1 to about 5:1.

The polymerization is, preferably, conducted in the gas phase using a continuous fluidized process. A typical fluidized bed reactor is described in U.S. Pat. No. 4,482,687.

A relatively low density copolymer is prepared for the first component and a relatively high density copolymer as the second component. The weight ratio of the first copolymer to the second copolymer can be in the range of about 70:30 to about 30:70.

The low density component:

The flow index can be in the range of about 5 to about 75 grams per 10 minutes, and is preferably in the range of about 5 to about 25 grams per 10 minutes. The molecular weight of this polymer is, generally, in the range of about 87,000 to about 190,000. The density of the copolymer can be in the range of 0.860 to 0.930 gram per cubic centimeter, and is preferably in the range of 0.890 to 0.920 gram per cubic centimeter. The melt flow ratio of the polymer can be in the range of about 10 to about 50, and is preferably about 15 to about 40. The Mw/Mn ratio can be in the range of about 2 to about 4, and is preferably in the range of about 2.5 to about 3.5.

Melt index is determined under ASTM D-1238, Condition E. It is measured at 190 degrees C. and 2.16 kilograms and reported as grams per 10 minutes. Flow index is determined under ASTM D-1238, Condition F. It is measured at 190 degrees C. and 10 times the weight used in determining the melt index, and reported as grams per 10 minutes. Melt flow ratio is the ratio of flow index to melt index.

The high density component:

The flow index can be in the range of about 5 to about 75 grams per 10 minutes, and is preferably in the range of about 5 to about 25 grams per 10 minutes. The molecular weight of the high density copolymer is, generally, in the range of about 87,000 to about 190,000. The density of the copolymer can be in the range of 0.935 to 0.970 gram per cubic centimeter, and is preferably in the range of 0.935 to 0.960 gram per cubic centimeter. The melt flow ratio of this copolymer can be in the range of about 10 to about 50, and is preferably about 15 to about 40. The Mw/Mn ratio can be in the range of about 2 to about 4, and is preferably in the range of about 2.5 to about 3.5.

The blend or final product can have a flow index in the range of about 5 to about 50 grams per 10 minutes. The molecular weight of the final product is, generally, in the range of about 98,000 to about 190,000. The density of the blend can be in the range of 0.900 to 0.940 gram per cubic centimeter, and is preferably in the range of 0.900 to 0.935 gram per cubic centimeter. The melt flow ratio of the blend can be in the range of about 10 to about 50, and is preferably in the range of about 15 to about 35.

The blend can have an Mw/Mn ratio of about 2 to about 8, and preferably has an Mw/Mn ratio of about 3 to about 6. Mw is the weight average molecular weight; Mn is the number average molecular weight; and the Mw/Mn ratio can be referred to as the polydispersity index, which is a measure of the breadth of the molecular weight distribution.

The low density component:

The mole ratio of alpha-olefin to ethylene can be in the range of about 0.10:1 to about 1.6:1, and is preferably in the range of about 0.14:1 to about 0.83:1. The mole ratio of hydrogen (if used) to ethylene can be in the range of about 0.01:1 to about 0.9:1, and is preferably in the range of about 0.01:1 to about 0.54:1. The operating temperature is generally in the range of about 60 degrees C. to about 100 degrees C. Preferred operating temperatures vary depending on the density desired, i.e., lower temperatures for lower densities and higher temperatures for higher densities.

The high density component:

The mole ratio of alpha-olefin to ethylene can be in the range of about 0.004:1 to about 0.15:1, and is preferably in the range of about 0.004:1 to about 0.10:1. The mole ratio of hydrogen to ethylene can be in the range of about 0.02:1 to about 1:1, and is preferably in the range of about 0.045:1 to about 0.68:1. The operating temperature is generally in the range of about 70 degrees C. to about 100 degrees C. As mentioned above, the temperature is preferably varied with the desired density.

The pressure is generally the same for preparing both components. The pressure can be in the range of about 200 to about 450 psig and is preferably in the range of about 280 to about 350 psig.

A typical fluidized bed reactor can be described as follows:

The bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, i.e., comonomers and, if desired, modifiers and/or an inert carrier gas.

The essential parts of the reaction system are the vessel, the bed, the gas distribution plate, inlet and outlet piping, a compressor, cycle gas cooler, and a product discharge system. In the vessel, above the bed, there is a velocity reduction zone, and, in the bed, a reaction zone. Both are above the gas distribution plate.

Conventional additives, which can be introduced into the blend, are exemplified by antioxidants, ultraviolet absorbers, antistatic agents, pigments, dyes, nucleating agents, fillers, slip agents, fire retardants, plasticizers, processing aids, lubricants, stabilizers, smoke inhibitors, viscosity control agents, crosslinking agents, catalysts, and boosters, tackifiers, and anti-blocking agents. Aside from the fillers, the additives can be present in the blend in amounts of about 0.1 to about 10 parts by weight of additive for each 100 parts by weight of polymer blend. Fillers can be added in amounts of up to 200 parts by weight and more for each 100 parts by weight of the blend.

Advantages of the film prepared from the in situ blend of this invention are as follows: higher Elmendorf Tear Strength in the machine direction, higher puncture strength, improved MD/TD Elmendorf Tear balance at higher MD film orientation, and higher secant modulus.

Patents mentioned in this specification are incorporated by reference herein.

The invention is illustrated by the following examples.

EXAMPLE 1

The preferred catalyst system is one where the precursor is formed by spray drying and is used in slurry form. Such a catalyst precursor, for example, contains titanium, magnesium, aluminum halides, and an electron donor. The precursor is then introduced into a hydrocarbon medium such as mineral oil to provide the slurry form. See U.S. Pat. No. 5,290,745 ('745). The catalyst composition and method of preparing same used in this example is of the same composition and preparation method as example 1 of '745 except that 0.45 mol of diethylaluminum chloride per mol of tetrahydrofuran is used instead of 0.5 mol.

Polyethylene is produced using the following standard procedure.

Ethylene is copolymerized with 1-hexene in each reactor. Trimethylaluminum (TMA) cocatalyst is added to each reactor during polymerization as a 2 weight percent solution in isopentane in the first reactor and a 1 weight percent solution in isopentane in the second reactor. The temperature in the first reactor is 70 degrees C. and the temperature in the second reactor is 80 degrees C. The pressure in each reactor is 300 pounds per square inch absolute (psia). Each polymerization is continuously conducted after equilibrium is reached under the conditions set forth here and in the Table.

Polymerization is initiated in the first reactor by continuously feeding the above catalyst precursor and cocatalyst into a fluidized bed of polyethylene granules together with ethylene, 1-hexene, and hydrogen. The resulting copolymer mixed with active catalyst is withdrawn from the first reactor and transferred to the second reactor using nitrogen as a transfer medium. The second reactor also contains a fluidized bed of polyethylene granules. Again, ethylene, 1-hexene, and hydrogen are introduced into the second reactor where they come into contact with the copolymer and catalyst from the first reactor. Additional cocatalyst is also introduced. The product blend is continuously removed.

Variable polymerization conditions, resin properties, film extrusion conditions, and film properties are set forth in Table I. All molecular weights in this specification are weight average molecular weights unless otherwise designated.

TABLE I

| Polymerization conditions | first component | second component |
|---|---|---|
| C2 partial pressure (psia) | 35 | 68 |
| H2/C2 molar ratio | 0.160 | 0.310 |
| C6/C2 molar ratio | 0.185 | 0.024 |
| Catalyst feeder (rpm) | 6000 | — |
| TMA feed rate (cc/hr) | 100 | 130 |
| C2 feed (lbs/hr) | 19 | 24 |
| Total production rate (lbs/hr) | 25 | 55 |
| bed weight (lbs) | 80 | 120 |
| Residence time (hrs) | 3.20 | 2.20 |
| Recycle isopentane (mol %) | 6 | 15 |
| Al/Ti molar ratio | 19 | 28 |
| Titanium split (weight %) | 0.450 | 0.550 |
| Computer indicated split (weight %) | 0.49 | 0.51 |

| Resin properties | first component | second component | final product |
|---|---|---|---|
| Flow index (g/10 min) | 12 | 13 | 12.5 |
| melt index (g/10 min) | 0.48 | 0.48 | 0.47 |
| Density (g/cc) | 0.902 | 0.950 | 0.924 |
| Melt flow ratio | 25.0 | 27.0 | 26.6 |
| Residual aluminum (ppm) | 66 | — | 41 |
| Residual titanium (ppm) | 6 | — | 2.7 |
| Bulk density (lbs/cu ft) | 21 | — | 22 |
| Average particle size (inch) | 0.017 | — | 0.018 |
| fines: less than 120 mesh (wt %) | 0.8 | — | 2 |
| Mw/Mn | 3.5 | 3.5 | 3.63 |
| Film extrusion conditions | | | |
| Melt temperature (degrees C.) | — | — | 470 |
| Die rate(lbs/hr/in) | — | — | 10 |
| Frostline height (inches) | — | — | 20 |
| Blow up ratio | — | — | 2.8:1 |
| Gauge (mil) | — | — | 0.85 |
| Film properties: | | | |
| Elmendorf Tear Strength (grams/mil) | | | |
| Machine direction | — | — | 765 |
| Transverse | — | — | 1007 |

TABLE I-continued

| | | | |
|---|---|---|---|
| direction | | | |
| Dart impact | — | — | 140 |

EXAMPLES 2 TO 16

For comparison purposes, Examples 2 to 6 are representative of a commercially available polyethylene copolymer prepared in a single gas phase reactor with similar molecular weight, molecular weight distribution, and density to the blends prepared in this invention.

TABLE II

| Example | | 2 | 3 | 4 | 5 | 6 |
|---|---|---|---|---|---|---|
| RESIN PROPERTIES | | | | | | |
| DENSITY | | 0.9266 | 0.9266 | 0.9266 | 0.9266 | 0.9266 |
| MI | | 0.54 | 0.54 | 0.54 | 0.54 | 0.54 |
| FI | | 13.5 | 13.5 | 13.5 | 13.5 | 13.5 |
| MFR | | 25.0 | 25.0 | 25.0 | 25.0 | 25.0 |
| GLOUCESTER INFO | | | | | | |
| DIE GAP | | 60 | 60 | 60 | 120 | 120 |
| GAUGE (MILS) | | 0.85 | 0.85 | 0.85 | 0.85 | 0.85 |
| BUR | | 2.8:1 | 3.4:1 | 4:1 | 2.8:1 | 3.4:1 |
| SCREW RPM | | 32 | 32 | 32 | 30 | 30 |
| LBS/HR | | 186.5 | 188.4 | 188.4 | 190.3 | 190.3 |
| LBS/HR/RPM | | 5.8 | 5.9 | 5.9 | 6.3 | 6.3 |
| LBS/HR/INCH DIE | | 9.9 | 10 | 10 | 10.1 | 10.1 |
| DRIVE AMPS | | 165 | 128 | 131 | 160 | 160 |
| MELT TEMP (DEG F.) | | 470 | 472 | 472 | 470 | 469 |
| HEAD PRESSURE (PSI) | | 5320 | 5180 | 5160 | 4300 | 4320 |
| FROST LINE HEIGHT (inches) | | 20 | 19.5 | 19.5 | 20 | 20 |
| FILM PROPERTIES | | | | | | |
| TENSILE STRENGTH (PSI) | MD | 7100 | 8180 | 7320 | 6940 | 8700 |
| | TD | 6800 | 7500 | 8160 | 6660 | 7500 |
| % ELONGATION | MD | 505 | 607 | 569 | 452 | 525 |
| | TD | 748 | 743.1 | 694 | 718 | 735 |
| YIELD STRENGTH (PSI) | MD | 2060 | 2100 | 2130 | 2100 | 2130 |
| | TD | 2070 | 2180 | 2250 | 2180 | 2190 |
| SECANT MODULUS AT 1% (PSI) | MD | 38120 | 25530 | 38440 | 36740 | 35400 |
| | TD | 42730 | 42420 | 39690 | 41340 | 41250 |
| ELMENDORF TEAR (GRAMS/MIL) | MD | 304 | 350 | 382 | 443 | 423 |
| | TD | 636 | 569 | 474 | 808 | 723 |
| MD/TD ratio | | 0.48 | 0.61 | 0.81 | 0.55 | 0.58 |
| TENSILE IMPACT (LBS/CU IN) | MD | 2170 | 2160 | 2340 | 2120 | 2250 |
| | TD | 1730 | 1860 | 1980 | 1790 | 1900 |
| PUNCTURE (ENERGY/MIL) | | 22.7 | 21.0 | 22.1 | 28.3 | 26.0 |

Examples 7 through 11 contain the film extrusion and property information on the blend, which is the subject of this invention. The blend is prepared as in example 1.

TABLE II(continued)

|  |  | 7 | 8 | 9 | 10 | 11 |
|---|---|---|---|---|---|---|
| RESIN PROPERTIES | | | | | | |
| DENSITY | | 0.9261 | 0.9261 | 0.9261 | 0.9261 | 0.9261 |
| MI | | 0.47 | 0.47 | 0.47 | 0.47 | 0.47 |
| FI | | 12.5 | 12.5 | 12.5 | 12.5 | 12.5 |
| MFR | | 26.6 | 26.6 | 26.6 | 26.6 | 26.6 |
| GLOUCESTER INFO | | | | | | |
| DIE GAP | | 60 | 60 | 60 | 120 | 120 |
| GAUGE (MILS) | | 0.85 | 0.85 | 0.85 | 0.85 | 0.85 |
| BUR | | 4:1 | 3.4:1 | 2.8:1 | 2.8:1 | 3.4:1 |
| SCREW RPM | | 31 | 31 | 31 | 29 | 29 |
| LBS/HR | | 183 | 183 | 183 | 191.4 | 191.4 |
| LBS/HR/RPM | | 5.9 | 5.9 | 5.9 | 6.6 | 6.6 |
| LBS/HR/INCH DIE | | 10 | 10 | 10 | 10.1 | 10.1 |
| DRIVE AMPS | | 165 | 170 | 170 | 170 | 160 |
| MELT TEMP (DEG F.) | | 471 | 466 | 468 | 470 | 470 |
| HEAD PRESSURE (PSI) | | 5600 | 5610 | 5520 | 4560 | 4660 |
| FROST LINE HEIGHT (inches) | | 20 | 20 | 20 | 20 | 20 |
| FILM PROPERTIES | | | | | | |
| TENSILE STRENGTH (PSI) | MD | 6770 | 7520 | 6800 | 7650 | 7570 |
|  | TD | 5510 | 6250 | 5430 | 5510 | 6260 |
| % ELONGATION | MD | 521 | 513 | 453 | 441 | 472 |
|  | TD | 650 | 714 | 664 | 710 | 710 |
| YIELD STRENGTH (PSI) | MD | 2220 | 2140 | 2060 | NY | 2180 |
|  | TD | 2170 | 2310 | 2310 | 2360 | 2450 |
| SECANT MODULUS AT 1% (PSI) | MD | 44770 | 43710 | 41830 | 43450 | 43510 |
|  | TD | 500000 | 53530 | 50700 | 51550 | 47610 |
| ELMENDORF TEAR (GRAMS/MIL) | MD | 536 | 632 | 765 | 667 | 716 |
|  | TD | 725 | 785 | 1007 | 1052 | 937 |
| MD/TD ratio | | 0.74 | 0.81 | 0.76 | 0.63 | 0.76 |
| TENSILE IMPACT (LBS/CU IN) | MD | 2220 | 2220 | 2180 | 2120 | 2190 |
|  | TD | 1790 | 1710 | 1910 | 1540 | 1660 |
| PUNCTURE (ENERGY/MIL) | | 28.0 | 22.8 | 27.6 | 29.7 | 27.6 |

We claim:

1. A blend comprising a mixture of two ethylene/alpha-olefin copolymers, said blend having a flow index in the range of about 5 to about 50 grams per 10 minutes; a melt flow ratio in the range of about 10 to about 50; a density in the range of 0.900 to 0.940 gram per cubic centimeter; a weight average molecular weight in the range of about 98,000 to about 190,000; and an Mw/Mn ratio in the range of about 2 to about 8, said blend having been prepared by mixing first and second copolymers having about equal molecular weights, each copolymer being a copolymer of ethylene and an alpha-olefin having 3 to 8 carbon atoms, the first copolymer having a flow index in the range of about 5 to about 75 grams per 10 minutes; a melt flow ratio in the range of about 10 to about 50; a density in the range of 0.860 to 0.930 gram per cubic centimeter; a weight average molecular weight in the range of about 87,000 to about 190,000; and an Mw/Mn ratio in the range of about 2 to about 4 and the second copolymer having a flow index in the range of about 5 to about 75 grams per 10 minutes; a melt flow ratio in the range of about 10 to about 50; a density in the range of 0.935 to 0.970 gram per cubic centimeter; a weight average molecular weight in the range of about 87,000 to about 190,000; and an Mw/Mn ratio in the range of about 2 to about 4, the weight ratio of the first copolymer to the second copolymer being in the range of about 70:30 to about 30:70.

2. The blend defined in claim 1 wherein the blend has a melt flow ratio in the range of about 15 to about 35; a density in the range of 0.900 to 0.935 gram per cubic centimeter; and an Mw/Mn ratio in the range of about 3 to about 6.

3. The blend defined in claim 1 wherein the first copolymer has a flow index in the range of about 5 to about 25 grams per 10 minutes; a weight average molecular weight in the range of about 87,000 to about 190,000; a melt flow ratio in the range of about 15 to about 40; a density in the range of 0.890 to 0.920 gram per cubic centimeter; and an Mw/Mn ratio in the range of about 2.5 to about 3.5, and the second copolymer has a flow index in the range of about 5 to about 25 grams per 10 minutes; a weight average molecular weight of about 87,000 to about 190,000; a melt flow ratio in the range of about 15 to about 40; a density in the range of 0.935 to 0.960 gram per cubic centimeter; and a Mw/Mn ratio in the range of about 2.5 to about 3.5.

4. The blend defined in claim 1 wherein the alpha-olefin is 1-hexene.

5. The blend defined in claim 1 wherein, in the first copolymer, the mole ratio of alpha-olefin to ethylene is in the range of about 0.1:1 to about 1.6:1 and the mole ratio of hydrogen, which is optional, to ethylene is in the range of about 0.01:1 to about 0.9:1, and, in the second copolymer, the mole ratio of alpha-olefin to ethylene is in the range of about 0.004:1 to about 0.15:1 and the mole ratio of hydrogen to ethylene is in the range of about 0.02:1 to about 1:1.

6. A blend comprising a mixture of two ethylene/alpha-olefin copolymers of about equal molecular weight, said blend having a flow index in the range of about 5 to about 50 grams per 10 minutes; a melt flow ratio in the range of about 15 to about 35; a density in the range of 0.900 to 0.935 gram per cubic centimeter; a weight average molecular weight in the range of about 98,000 to about 190,000 and an Mw/Mn ratio in the range of about 3 to about 6, said blend having been prepared, under polymerization conditions, in two reactors connected in series wherein, in the first reactor, a copolymer is prepared from ethylene and an alpha-olefin having 3 to 8 carbon atoms, said copolymer having a flow index in the range of about 5 to about 25 grams per 10 minutes; a melt flow ratio in the range of about 15 to about 40; a density in the range of 0.890 to 0.920 gram per cubic centimeter; a weight average molecular weight in the range of about 87,000 to about 190,000; and an Mw/Mn ratio in the range of about 2.5 to about 3.5, and, in the second reactor, a copolymer is prepared from ethylene and an alpha-olefin, which is the same as the alpha-olefin used in the first reactor, said copolymer having a flow index in the range of about 5 to about 25 grams per 10 minutes; a melt flow ratio in the range of about 15 to about 40; a density in the range of 0.935 to 0.960 gram per cubic centimeter; a weight average molecular weight in the range of about 87,000 to about 190,000; and an Mw/Mn ratio of about 2.5 to about 3.5, the weight ratio of the copolymer prepared in the first reactor to the copolymer prepared in the second reactor being in the range of about 70:30 to about 30:70, and wherein, in the first reactor, the mole ratio of alpha-olefin to ethylene is in the range of about 0.14:1 to about 0.83:1 and the mole ratio of hydrogen, which is optional, to ethylene is in the range of about 0.01:1 to about 0.54:1, and, in the second reactor, the mole ratio of alpha-olefin to ethylene is in the range of about 0.004:1 to about 0.1:1 and the mole ratio of hydrogen to ethylene is in the range of about 0.045:1 to about 0.68:1.

7. A film extruded from the in situ blend defined in claim 1 having an Elmendorf Tear Strength in the machine direction of at least about 500 grams per mil.

8. A film extruded from the in situ blend defined in claim 6 having an Elmendorf Tear Strength in the machine direction of at least about 600 grams per mil.

9. A film extruded from the in situ blend defined in claim 6 having an Elmendorf Tear Strength in the machine direction of at least 600 grams per mil and an Elmendorf Tear Strength in the transverse direction of at least 700 grams per mil.

\* \* \* \* \*